United States Patent [19]

Higuchi et al.

[11] 4,274,027
[45] Jun. 16, 1981

[54] SALIENT POLE ROTOR WITH SHIELDING RODS BETWEEN ADJACENT POLES

[75] Inventors: Shigeo Higuchi, Hitachiota; Tsutomu Iwasaki, Mito; Koji Sato, Hitachi; Yukio Hirama, Hitachi; Masatoshi Watanabe, Hitachi; Yasuyuki Wachi, Takahagi; Yasuhiro Yasaka, Hitachi, all of Japan

[73] Assignee: Hitachi, Ltd., Tokyo, Japan

[21] Appl. No.: 77,734

[22] Filed: Sep. 20, 1979

[30] Foreign Application Priority Data

Sep. 20, 1978 [JP] Japan ................................ 53-114556

[51] Int. Cl.³ .............................................. H02K 1/24
[52] U.S. Cl. ..................................... 310/269; 310/262
[58] Field of Search ............... 310/261, 262, 269, 214, 310/218, 43, 45

[56] References Cited

U.S. PATENT DOCUMENTS

| 918,498 | 4/1909 | Behrend | 310/262 |
|---|---|---|---|
| 944,303 | 6/1911 | Duvall | 310/269 |
| 1,262,774 | 4/1918 | Gilman | 310/262 X |
| 1,741,262 | 12/1929 | Wait | 310/214 |
| 2,858,462 | 10/1958 | Knaus | 310/214 |
| 3,106,654 | 10/1963 | Wesolowski | 310/269 X |
| 3,157,806 | 11/1964 | Wiedeman | |

FOREIGN PATENT DOCUMENTS 5158802 of 0000 Japan .

Primary Examiner—Mark O. Budd
Attorney, Agent, or Firm—Craig & Antonelli

[57] ABSTRACT

A rotor for electric rotating machines has a plurality of salient poles arranged in spaced relation in axial direction on the outer periphery of the rotor rim. Adjacent salient poles have opposed slots in the axial direction, into which a shielding member is fitted to bridge between said adjacent poles. The shielding member includes a plurality of rod members fitted over the entire length of said slots to extend across said opposed slots. While the rotor is running, the centrifugal force acts on each of said rod members thereby pressing the rod members against the outer periphery side wall of the slot. As a result, the centrifugal force is dispersed substantially uniformly over the entire length of the slot wall.

14 Claims, 14 Drawing Figures

SALIENT POLE ROTOR WITH SHIELDING RODS BETWEEN ADJACENT POLES

BACKGROUND OF THE INVENTION

1. Field of the Invention

This invention relates to a rotor with salient poles for electric rotating machines such as a hydraulic turbine generator, and more in particular to a construction of the shielding members for sealing the gaps between adjacent poles.

2. Description of the Prior Art

In recent years, the capacity and speed of hydraulic turbine generators have been remarkably increased. This trend is especially notable with high-head turbine generators used in such as pumping-up power stations. In such a hydraulic turbine generator of large capacity and high speed, an increased peripheral speed of the rotor causes the wind friction loss to be increased in proportion to the cube of the peripheral speed. As a result, the loss of the generator is increased thereby lowering its efficiency.

An attempt to reduce the wind frictional loss has been made by forming the rotor into a cylindrical appearance. An example of such a cylindrical rotor is disclosed in U.S. Pat. No. 3,157,806 issued Nov. 17, 1964 to Eugen Wiedemann, and Japanese Utility Model Application No. 131642/74 published without examination as Laid-Open No. 58802/76.

In those rotors, as shown in FIGS. 1 and 2, a plurality of salient poles 4 each including a field core 2 and a field coil 3 wound thereon are mounted along the outer periphery of a rotor rim 1 fixed to a rotor shaft (not shown), and a nonmagnetic shielding member 5 in flat form is suspended between the upper parts of adjacent field cores 2, so that the rotor is provided with a cylindrical appearance, thereby reducing the wind frictional loss. The shielding member 5 is mounted on the field cores 2 in such a manner that a slot 6 in parallel to the rotor shaft is formed in the side 2H of the upper part of each of the adjacent field cores and a lateral edge of the shielding member 5 is fitted into the slot 6 formed to one of the field cores, while the other lateral edge of the shielding member 5 is fitted into the slot 6 formed to the other of the adjacent field cores.

In this construction, as the capacity and speed of the hydraulic turbine generator increase, the outer diameter of the rotor increases accordingly, which in turn, as well as its increased speed, increase the centrifugal force exerted on the shielding member 5, so that the thickness t of the shielding member 5 is required to be increased in order to endure the increased centrifugal force. The shielding member 5 may be constructed of a single flat plate or a plurality of flat plates disposed side-by-side. In actual cases, such a plurality of flat plates each having an appropriate width L are arranged to make up the shielding member 5 in consideration of the convenience in production of the flat plates and their fitting into the slot 6.

In such construction, however, it may occur that due to errors in production of the flat plates and/or in forming the slot 6 in the side 2H of the upper part of the field core, as well as the temperature rise during operation, the end walls of the flat plates making up the shielding member 5 fail to come into close contact with the outer periphery side wall 6S of the slot 6 but partial contact with the wall 6a, as shown in FIG. 3. As a result, all the centrifugal force exerted on the flat plates of which the weight is increased by an increased thickness t is applied to the partial contact points A and B, thus producing an excess stress locally in the wall of the slot 6. In view of the fact that the slot 6 is formed in the field core 2 at a portion 2H near to its outer periphery, as shown in FIG. 1, the height H of the top marginal portion 2H must be more than sufficient to prevent the slot 6 from being damaged by the local excess stress. This results in an increased size of the salient poles 4, thus increasing the outer diameters and weight of the rotor and stator (not shown) disadvantageously.

To point A, in particular, the centrifugal forces of two adjacent flat plates are additively imparted as shown in FIG. 3, and therefore it is subjected to a greater stress than the partial contact point B, thereby leading to an uneven stress distribution over the entire length of the wall of the slot 6.

SUMMARY OF THE INVENTION

An object of the present invention is to provide a rotor with salient poles in which the centrifugal force acting on the shielding member is dispersed over the entire length of the wall of the slot into which the shielding member is fitted.

In order to achieve the above-mentioned object, the rotor of the present invention is arranged such that the shield member is made of, instead of the conventional flat plates, a plurality of rod members arranged side-by-side substantially perpendicular to the axial direction of the rotor.

DESCRIPTION OF THE PREFERRED EMBODIMENTS

Figure 1:
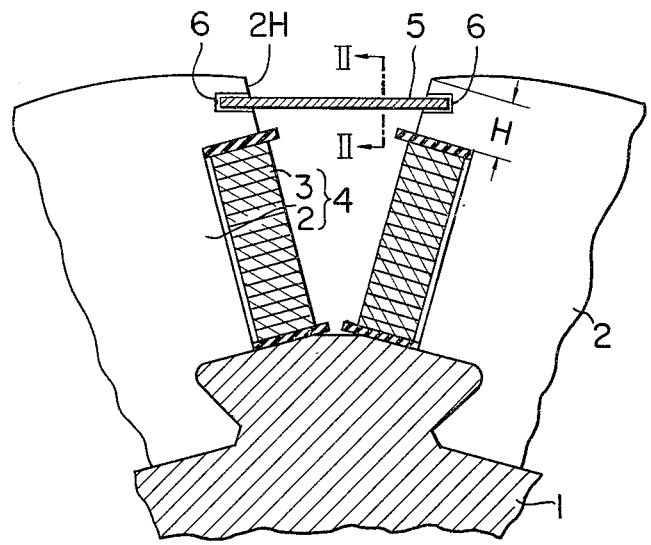
FIG. 1 is a sectional view showing the essential parts of a conventional rotor with salient poles.
Figure 2:
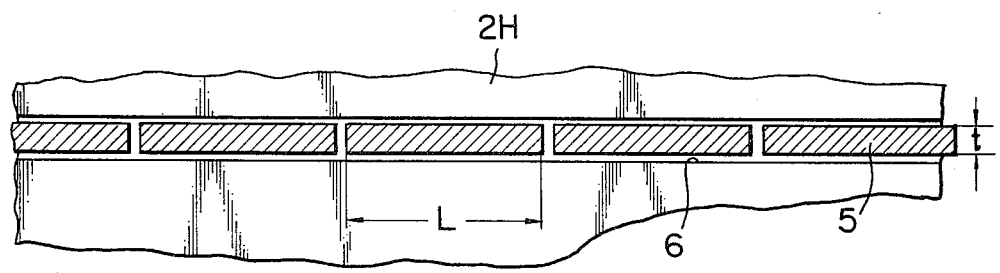
FIG. 2 is an enlarged sectional view along the line II—II in FIG. 1.
Figure 3:
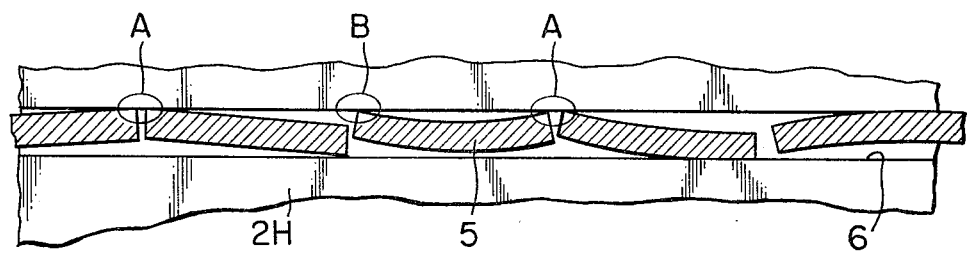
FIG. 3 is a sectional view showing the deformed state of the shielding member shown in FIG. 2.
Figure 4:
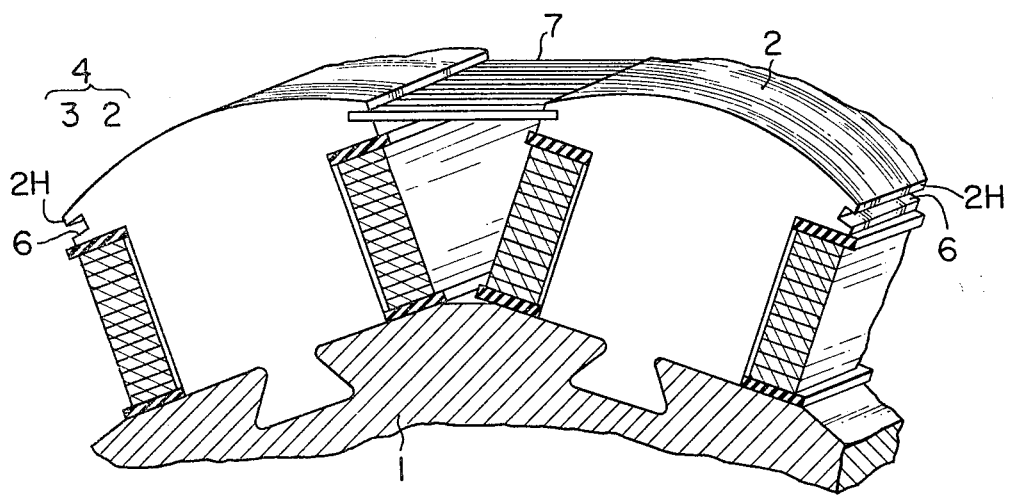
FIG. 4 is a perspective sectional view showing the essential parts of the rotor with salient poles in an embodiment of the present invention.
Figure 5:
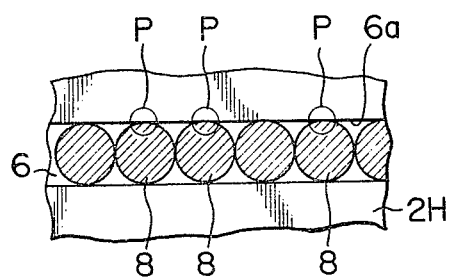
FIGS. 5 to 8 are sectional views showing the essential parts of the shielding member according to the present invention as fitted into a slot.

Now, an embodiment of the present invention will be described with reference to FIGS. 4 and 5. In FIGS. 4 and 5, components similar or equivalent to those in FIGS. 1 and 3 are denoted by like reference numerals. The construction of the rotor of this embodiment is substantially the same as that of the conventional rotor, except for the arrangement of the shielding member 7 fitted into the slots 6 formed in top portions of the sides 2H of adjacent field cores 2. In other words, according to the present invention, the shielding member 7 is made by assembling a multiplicity of rod members 8 having a circular section. The ends of each of the rod members 8 are fitted into the slots 6 of adjacent field cores 2 so that no gap exists between any adjacent rod members 8 over the entire length of the slot. After the rod members 8 are fitted into the slots so that the space between adjacent field cores 2 is sealed, suitable stoppers (not shown) are attached to the axial ends of the slots 6 for preventing the rod members 8 from being removed, thus making up the shielding member 7. The rod members 8 are made of a non-magnetic material such as plastics reinforced by glass fiber or stainless steel, because they bridge the adjacent field cores.

By using a plurality of independent rod members 8 for the shielding member 7, the centrifugal force exerted on each of the rod members 8 is much smaller than the centrifugal force acting on each of the conventional flat plates. Since each rod member 8 has a circular section, it is always in contact at a point P with the outer periphery side wall 6a of the slot 6 as shown in FIG. 5. Further, the contact points P of the rod members 8 are disposed at substantially uniform intervals therebetween corresponding to the diameter thereof, so that the stress applied to the wall 6a on the outer periphery side is distributed substantially uniformly over the entire length of the wall.

As a result, the present invention eliminates the disadvantages of the prior art such that due to the fact that the centrifugal force acting on the shield member 7 is received non-uniformly by a smaller number of points on the wall 6a of the slot 6, the height of the top marginal portion 2H must be greater so as not to damage that portion, resulting in the necessity of disadvantageously increasing the outer diameters of the rotor and the stator.

Figure 6:
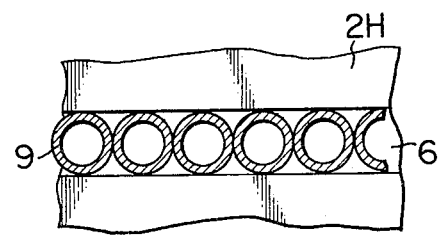

The rod members 8 of cylindrical solid form used in the above-mentioned embodiment may be replaced by hollow rod members 9 as shown in FIG. 6 with equal effect. If hollow rod membes 9 are used, the weight of the rod members is reduced without decreasing the strength thereof, thus making it possible to reduce the centrifugal force exerted on the hollow rod members 9 as compared with the centrifugal force by the solid rod members 8 of FIG. 5. As a consequence, the marginal portion 2H of the field core may be shorten.

Figure 7:
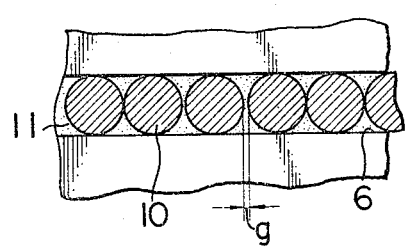
Figure 8:
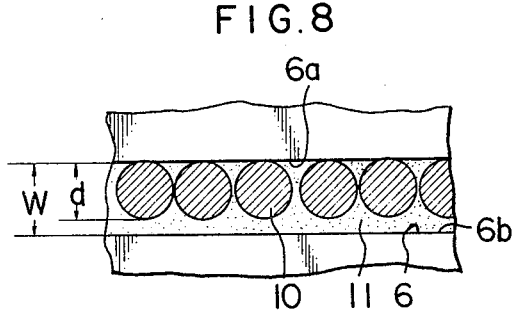

In FIGS. 7 and 8, the gap between the cylindrical or hollow rod members 10 in the slot 6 is filled with a bonding agent 11 in order to prevent the rod members 10 from chattering while the rotor is in operation. Specifically, FIG. 7 shows the case in which the gap g is formed between adjacent rod members 10 the bonding agent 11 is filled and cured in the space in the slot 6 including this gap, thereby preventing the rod members 10 from loosely displacing along the slot. On the other hand, FIG. 8 shows the case in which the width W of the slot 6 is considerably larger than the diameter d of the rod members 10. In this case, too, as in FIG. 7, the bonding agent 7 is filled and cured in the space in the slot 6, while keeping the rod members 10 in contact with the outer periphery side wall 6a of the slot 6 and separating by a gap from the inner periphery side wall 6b. As a result, the centrifugal force acting on the rod members 10 is not received by the bonding agent 11, but by the outer periphery side wall 6a directly, so that the stress is distributed evenly over the entire length along the outer periphery side wall 6a.

Figure 9:
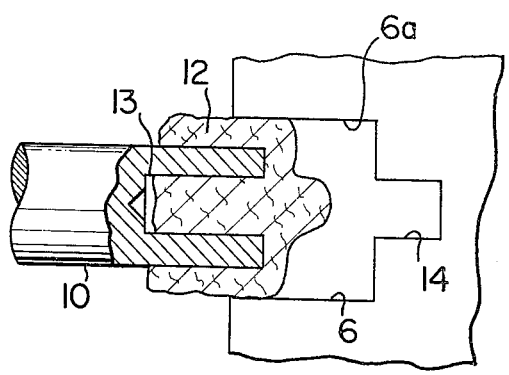
FIGS. 9 to 12 are sectional side views showing the end part of the shielding member according to the present invention as fitted into a slot.
Figure 10:
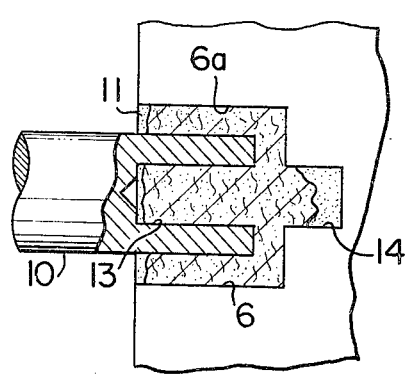

The present invention is not limited to the configuration of FIGS. 7 and 8 in which the rod members 10 are in direct contact with the outer periphery side wall 6a of the slot 6 thereby to prevent them from chattering. As an alternative, the bonding agent 11 may be filled and cured in the gap between the rod members 10 and the outer periphery side wall 6a, as well as the gap between the rod members 10 and the inner periphery side wall 6b. In this case, however, it may happen that the centrifugal force by the rod members is exerted on the cured bonding agent thereby to crush the same. Should the bonding agent be thus crushed, crushed powder or chips of the bonding agent would scatter and damage the insulation of the coil on the state side. In order to prevent such a trouble, the rod member 10 with the ends thereof covered with fiber 12 such as glass fiber (FIG. 9) is inserted into the slot 6 and then the bonding agent 11 is filled and cured in the space between the rod member 10 including the fiber 12 and the slot wall (FIG. 10). The bonding agent 11 may be filled at any suitable time. For example, the fiber 12 impregnated with the bonding agent 11 may be covered on the rod member 10 before it is inserted into the slot 6.

By impregnating the fiber 12 with the bonding agent 11 and curing it in the manner mentioned above, the bonding agent 11 is reinforced by the fiber 12. The fiber reinforced bonding agent filled between the rod member 10 and the outer periphery side wall 6a of the slot 6 not only prevents the rod members 10 from chattering in the slot, but also bears against the centrifugal force by the rod members 10 without being crushed.

Further, recesses 13 and 14 may be formed in the opposite parts of the bottom wall of the slot 6 and the end portion of the rod member 10 and filled with fiber 12, which is impregnated and cured with the bonding agent 11. In this way, the bonding agent 11 between the rod member 10 and the slot wall is strengthened on the one hand and the rod member 10 is more strongly secured in the slot 6 on the other. In other words, the bonding agent 11 is held stationary by the fiber 12 during the processes of filling, impregnation and curing, thus obviating the problem of the lack of bonding power due to the shortage of the bonding agent.

In the case where the rod member 10 is hollow, the ends of the rod member 10 are filled with the bonding agent 11 reinforced by the fiber 12, and therefore the mechanical strength of the ends of the hollow rod member 10 is improved, thus preventing it from being crushed by the centrifugal force.

In the rotor having the construction as shown in FIG. 4, each of the salient poles 4 is extended radially outwardly by the centrifugal force and the temperature rise while the rotor is running. As a result, the distance between the opposed slots 6 of adjacent field cores is somewhat larger when the rotor is running than when it is stationary, so that the ends of the rod member 10 are displaced toward the opening of the slot 6 while the rotor is running. In the case where the ends of the rod member 10 are covered with the bonding agent 11 reinforced by the fiber 12 as shown in FIGS. 9 and 10, however, such displacement is not serious since it causes merely the rod member 10 to slip from the bonding agent 11 and move back and forth even with vibration. In the case where the ends of the rod member 10 are covered only with the bonding agent 11, however, vibrations combined with the slipping of the rod member from the bonding agent 11 makes it possible to damage and scatter the bonding agent 11 filled up between the rod member 10 and the slot wall. In order to obviate such a possibility, adjusting members 15 and 16 having a coefficient of thermal expansion larger than that of the rod member and the bonding agent are provided at the ends of the rod member 10 as shown in FIGS. 11 and 12.

Figure 11:
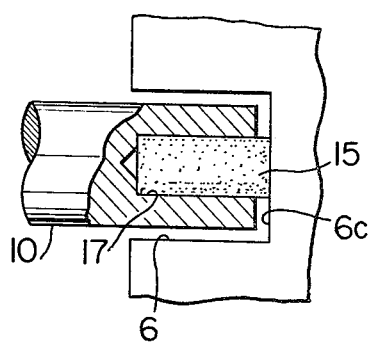
Figure 12:
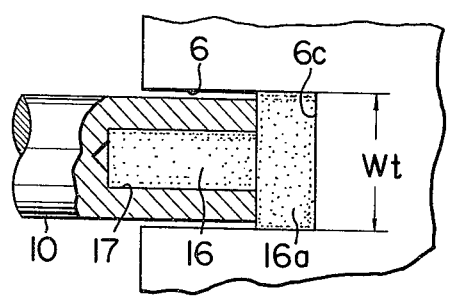

Specifically, with reference to FIG. 11, the end of the rod member 10 is formed with a hole 17 into which one end of the adjustng member 15 is inserted, while the other end of the adjusting member 15 is brought into contact with the bottom wall of the slot 6. While the rotor is running, the salient poles 14 increase in temperature up to 80° to 100° C., with the result that the adjusting member 15 elongates in the longitudinal direction of the rod member. Thus the elongation of the distance between the opposed slots 6 of adjacent field cores is absorbed, so that the chattering of the rod members which otherwise might occur by the increased distance between the opposed slots is reduced considerably and the rod members 10 are stably supported. In the embodiment of FIG. 12, on the other hand, an adjusting member 16 similar to the adjusting member 15 of FIG. 11 but having a large-diameter part 16a at the end thereof, whose diameter is almost the same as the width Wt of the slot, is inserted into the end hole 17 of the rod member 10 so that the large-diameter portion 16a is kept in contact with the bottom wall 6c. In this way the displacement in the longitudinal direction of the rod member is absorbed on the one hand and the chattering thereof along the width of the slot 6 is eliminated on the other hand.

The foregoing description refers to a shielding member comprised of a plurality of rod members and the manner in which the rod members are supported in the slot of the field core. Since the slot is sometimes as long as 3 to 4 m, it is troublesome in construction to insert the rod members one by one into the slot.

Figure 13:
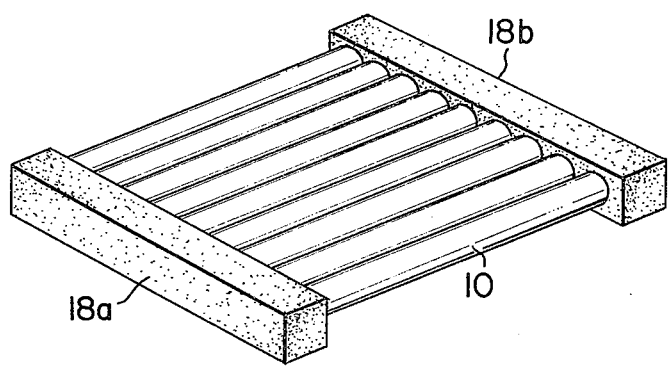
FIG. 13 is a perspective view showing another shielding member according to the present invention.
Figure 14:
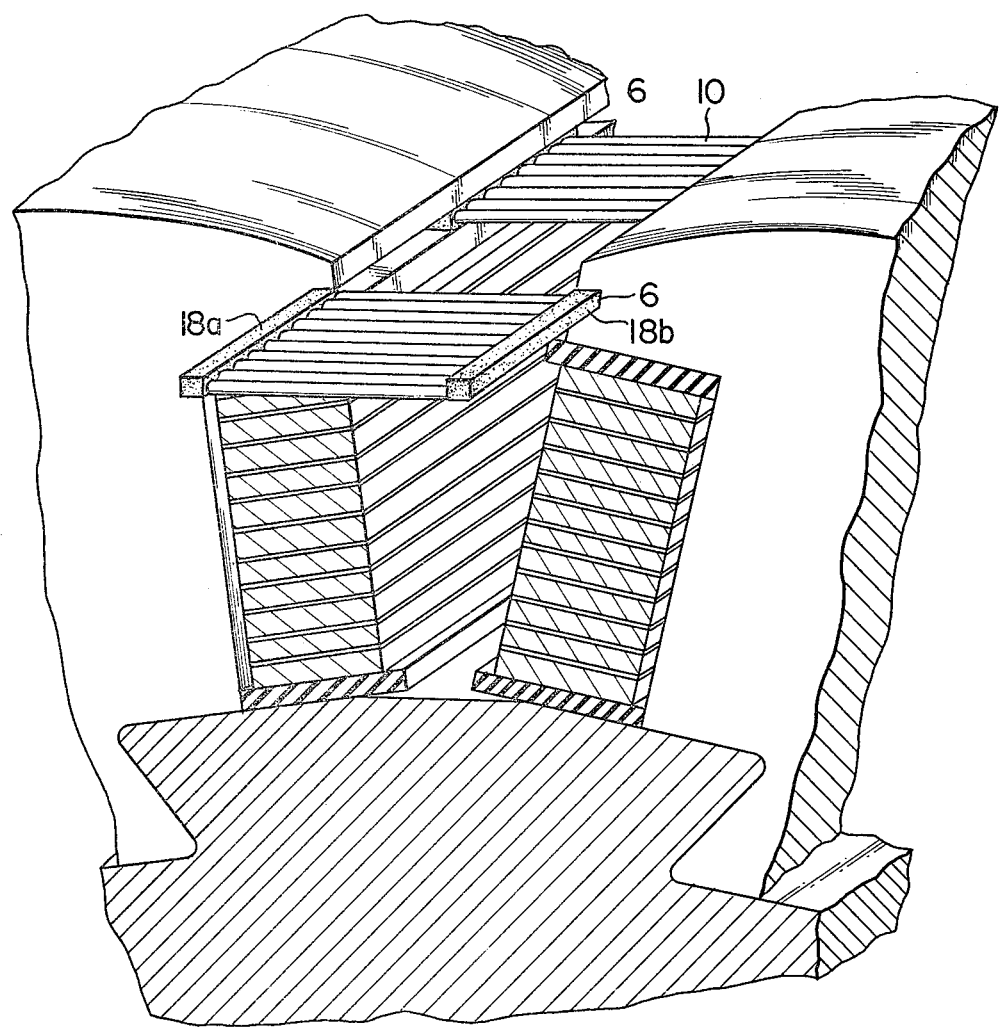
FIG. 14 is a perspective view showing a part of the rotor assembled with the shielding member of FIG. 13.

In the embodiments shown in FIGS. 13 and 14, a suitable number of rod members 10 are formed into a unitary block to facilitate the insertion thereof into the slot 6. In other words, the rod members 10 are arranged in close contact with each other in parallel and under this condition the ends of the rod members are connected by common connecting members 18a and 18b made of, for example, fiber-reinforced plastic. The block of rod members 10 constructed in this way is inserted in the same manner as the conventional shielding member of flat form, thus making it possible to insert a large number of rod members 10 into the slot 6 at one time. The insertion work of the rod members 10 into the slot 6 is thus simplified. Further, the rod members 10, which are integrally connected by the connecting members 18a and 18b, do not chatter in the slot 6. If there is a gap between the slot wall and the connecting members 18a and 18b, the gap is filled up with a bonding agent, which is cured to prevent the connecting members 18a and 18b from moving in the slot 6.

It will be understood from the foregoing description that according to the present invention slots parallel to rotor axis are formed opposingly in the top marginal portions of the opposed sides of adjacent field cores, and a plurality of rod members are fitted into the slots so as to bridge between the slots, thereby making up a shielding member. Upon generation of a centrifugal force, each rod member is pressed against the outer periphery side wall of the slot. The centrifugal force acting on the shielding member is dispersed to many points which are disposed at intervals of rod members over the entire length of the slot wall.

We claim:

1. A rotor for electric rotating machine comprising; a rotor rim, a plurality of salient poles mounted around said rotor rim, each of said salient poles including a field core secured to said rotor rim and a field coil wound around the core, and a plurality of shielding rod assemblies mounted between every adjacent two of said field cores so as to provide said rotor with a substantially cylindrical configuration each of said rod assemblies comprising a plurality of rod members extending transversely and closely side by side between the associated adjacent two field cores and fixed at their respective opposing ends into slots formed in respective opposing sides of said adjacent two field cores.

2. A rotor with salient poles according to claim 1, in which said rod members have a circular section.

3. A rotor with salient poles according to claim 2, in which said rod members are hollow.

4. A rotor with salient poles according to claim 1, in which said rod members are hollow.

5. A rotor with salient poles according to claim 1, in which each of said rod members is in contact with the outer periphery side wall of each of said slots at one point.

6. A rotor for electric rotating machine comprising; a rotor rim, a plurality of salient poles mounted around said rotor rim, each of said salient poles including a field core secured to said rotor rim and a field coil wound around the core, and a plurality of shielding rod assemblies mounted between every adjacent two of said field cores so as to provide said rotor with a substantially cylindrical configuration each of said rod assembles comprising a plurality of rod members extending transversely and closely side by side between the associated adjacent two field cores, and fixed at their respective opposing ends into slots formed in opposed sides of said adjacent two field cores by bonding agents filled in said slots.

7. A rotor with salient poles according to claim 6, in which each of said rod members is in contact with the outer periphery side wall of each of said slots.

8. A rotor with salient poles according to claim 6, in which at least that part of said bonding agent which is located between each of said rod members and said slot wall is reinforced by fiber.

9. A rotor for electric rotating machine comprising; a rotor rim, a plurality of salient poles mounted around said rotor rim, each of said salient poles including a field core secured to said rotor rim and a field coil wound around the core, and a plurality of shielding rod assemblies mounted between every adjacent two of said field cores so as to provide said rotor with a substantially cylindrical configuration each of said rod assemblies comprising a plurality of rod members extending transversely and closely side by side between the associated adjacent two field cores and fixed at their respective opposing ends to respective common connecting members which are securely fitted into slots formed in opposed sides of said adjacent two field cores.

10. A rotor with salient poles for electric rotating machines according to claim 9, in which said connecting member is made of plastics reinforced by fiber.

11. A rotor with salient poles according to claim 9, in which said plurality of rod members are divided into a plurality of blocks, the respective ends of the rod members within each block being connected by a connecting member.

12. A rotor for electric rotating machine comprising; a rotor rim, a plurality of salient poles mounted around said rotor rim, each of said salient poles including a field core secured to said rotor rim and a field coil wound around the core, and a plurality of shielding rod assemblies mounted between every adjacent two of said field cores so as to provide said rotor with a substantially cylindrical configuration each of said rod assemblies comprising a plurality of rod members extending transversely and closely side by side between the associated adjacent two field cores and each having adjusting members fixed to both opposing ends thereof and fitted into slots formed in opposing sides of said adjacent two field cores, respectively.

13. A rotor with salient poles according to claim 12, in which a longitudinal hole is formed in each end of said rod member, and part of one of said adjusting members is inserted into each of said holes respectively.

14. A rotor for electric rotating machine comprising; a rotor rim, a plurality of salient poles mounted around said rotor rim, each of said salient poles including a field core secured to said rotor rim and a field coil wound around the core, an plurality of shielding rod assemblies fixedly mounted between every adjacent two of said field cores so as to provide said rotor with a substantially cylindrical configuration, each of said rod assemblies comprising a plurality of hollow rod members extending transversely and closely side by side between the associated adjacent two field cores, and means for fixing the respective opposing ends of said hollow rod members into slots formed in respective opposing sides of said adjacent two field cores.

* * * * *